United States Patent
Wolf

(10) Patent No.: US 7,320,819 B2
(45) Date of Patent: Jan. 22, 2008

(54) SEALING STRIP

(75) Inventor: Alexander Wolf, Everode (DE)

(73) Assignee: Meteor Gummiwerke K.H. Bädje GmbH & Co. KG, Bockenem (DE)

(*) Notice: Subject to any disclaimer, the term of this patent is extended or adjusted under 35 U.S.C. 154(b) by 367 days.

(21) Appl. No.: 10/808,862

(22) Filed: Mar. 24, 2004

(65) Prior Publication Data

US 2005/0179218 A1 Aug. 18, 2005

(30) Foreign Application Priority Data

Feb. 13, 2004 (DE) .................. 20 2004 002 241 U

(51) Int. Cl.
*B32B 33/00* (2006.01)
(52) U.S. Cl. .................... 428/41.8; 428/40.1; 428/41.3; 428/41.5; 428/41.7; 428/42.1; 428/42.2; 428/67; 428/81; 428/114; 428/317.1; 428/319.3
(58) Field of Classification Search ............... 428/40.1, 428/41.3, 41.5, 41.7, 41.8, 42.1, 42.2, 67, 428/114, 317, 319.3, 81; 156/250
See application file for complete search history.

(56) References Cited

U.S. PATENT DOCUMENTS

| | | | |
|---|---|---|---|
| 1,243,699 A | 10/1917 | Brown | |
| 2,770,816 A * | 11/1956 | Reisner | 5/655.9 |
| 6,235,365 B1 * | 5/2001 | Schaughency et al. | 428/40.1 |

FOREIGN PATENT DOCUMENTS

| | | |
|---|---|---|
| DE | 81 29 131.0 | 5/1981 |
| DE | 297 20 683 U 1 | 11/1997 |
| EP | 1 502 844 | 2/2005 |
| WO | WO 99/26801 | 3/1999 |

* cited by examiner

*Primary Examiner*—Nasser Ahmad
(74) *Attorney, Agent, or Firm*—Synnestvedt & Lechner LLP

(57) ABSTRACT

A sealing strip is intended to seal a gap between two parts which are movable relative to each other. The sealing strip has a surface which is intended to adhere to one of the two parts and which has an adhesive layer. Before it is adhered to the one part, the adhesive layer is covered with a cover sheet. In order to make it easier to remove the cover sheet from the adhesive layer a pull-thread is provided which passes through the cover sheet and has at least one free end that protrudes from the sealing strip.

22 Claims, 3 Drawing Sheets

SEALING STRIP

CROSS REFERENCE TO RELATED APPLICATION

This application claims priority to German Utility Model Application 20 2004 002 241.9 filed 13 Feb. 2004, which is hereby incorporated by reference herein.

FIELD OF THE INVENTION

The invention relates to a sealing strip for sealing a gap between two parts which are movable relative to each other. In particular, the sealing strip may be used to seal a gap between a motor vehicle door and the adjacent edge of the vehicle structure.

BACKGROUND OF THE INVENTION

Sealing strips of this type are used not only in the field of vehicle construction but also in numerous other fields of machine and apparatus construction which are always faced with the problem of sealing a gap between two parts which are movable relative to each other in that the sealing strip is connected to one of the two parts and in the sealing condition is pressed elastically so as to lie against the other part.

In the case of a corresponding embodiment of the sealing strip, the connection to one part can be accomplished in a positive-locking manner by means of an elastic locking arrangement—however, an adhesive connection is frequently provided. For this purpose, the sealing strip normally consists of a layer which imparts the actual sealing effect and which is coated on one side with an adhesive layer, wherein for its part the adhesive layer is covered by a cover sheet.

All of these layers are tailored to one another in terms of their material and are geared in function towards the sealing effect which is to be achieved. In particular, the cover sheet is arranged in such a manner that there is no adhesive connection to the covered adhesive, so that the cover serves to keep the adhesive in an inactive yet usable state once the cover sheet has been removed. Where these conditions prevail, it is basically possible to use any physically hardening or chemically reacting, cold- or hot-curing adhesive.

To facilitate handling during assembly, it is known to provide sealing strips of this type with tear-off tabs which render it possible to take hold of the cover sheet manually to remove it just before assembly. In order to make the sealing strip ready for installation, it must first be cut in its original state to the required length and then be provided with at least one tear-off sheet of this type which in this case is typically adhered to the outer side of the cover sheet.

Sealing strips of this type are widely used in vehicle construction, so that the material requirement for providing the tear-off tabs, which consist e.g. of polyethylene, is considerable. Added to this are the operating costs incurred by connecting the tabs to the sealing strips.

These sealing strips are frequently installed under spatially restricted conditions, in particular at sites to which access cannot be gained easily. Since the substance of the said cover sheet is selected on the condition that it has only limited, or almost no, suitability for adhesive purposes, the possibility that the connection between the cover sheet and the tear-off tab will be broken cannot be entirely ruled out, so that the assembly procedure can sometimes become extremely laborious since after said connection has been broken the cover sheet must be separated from the adhesive layer in another way.

Against this background, it is the object of the invention to form a sealing strip of the type described in the introduction such that where material usage is reduced considerably, more rationalized working and secure handling are possible during assembly. In the case of this type of sealing strip, this object is achieved by a sealing strip having a removable cover sheet protecting an adhesive layer, wherein the cover layer has a tear thread that passes through it, the tear thread providing an auxiliary means for removing the cover sheet.

Accordingly, it is an aspect of the invention that the auxiliary means which is intended for manually removing the cover sheet is formed by merely a tear-thread which is inserted into the substance of the cover sheet or is anchored therein. The thread is dimensioned and its material selected such that it is suitable for transmitting the force sufficient for removing the cover sheet. The connection between the thread and the cover sheet is also arranged accordingly. In comparison with the prior art set forth in the introduction, this auxiliary means which preferably consists of synthetic material uses considerably less material and operates with a greater degree of reliability owing to a positive-locking connection with the cover sheet. One or even several tear-threads can be provided along the sealing strip.

Preferably, the tear-thread is provided on both ends with planar holding elements. Since the tear-thread passes through the substance of the cover sheet, these planar holding elements simultaneously form anchoring elements which ultimately support the positive connection to the cover sheet. These planar holding elements can be provided, for example, in the form of rectangular platelets but also cross-bars which extend perpendicular to the longitudinal extension of the tear-thread.

The procedure of producing a connection between tear-threads and the cover sheet can be performed in a mechanized manner using press-in or even shoot-in processes. In this manner, it is also possible to check that the tear-thread passes merely through the substance of the cover sheet and not through other layers of the sealing strips.

The layer forming the visible surface of the sealing strip can consist, for example, of rubber or other elastomer which can also be used in a foam-like consistency, whereas the adhesive layer consists of acrylic foam. However, the invention can basically be used for any sealing strips which for assembly purposes are prepared with an adhesive layer covered by a cover sheet, and furthermore irrespective of the adhesive system or material composition of the adhesive layer.

The sealing strip can be provided in a linear but also annular structure for the user and it is equipped in each case with one or several tear-threads. It offers significant advantages over the prior art set forth in the introduction with regard to its production costs, but in particular also with regard to its practical handling properties during assembly.

The invention will be explained in detail hereinunder with reference to the exemplified embodiment illustrated in the drawings and with reference to the exemplified embodiment associated with the prior art.

DETAILED DESCRIPTION OF PREFERRED EMBODIMENTS

Figure 4:
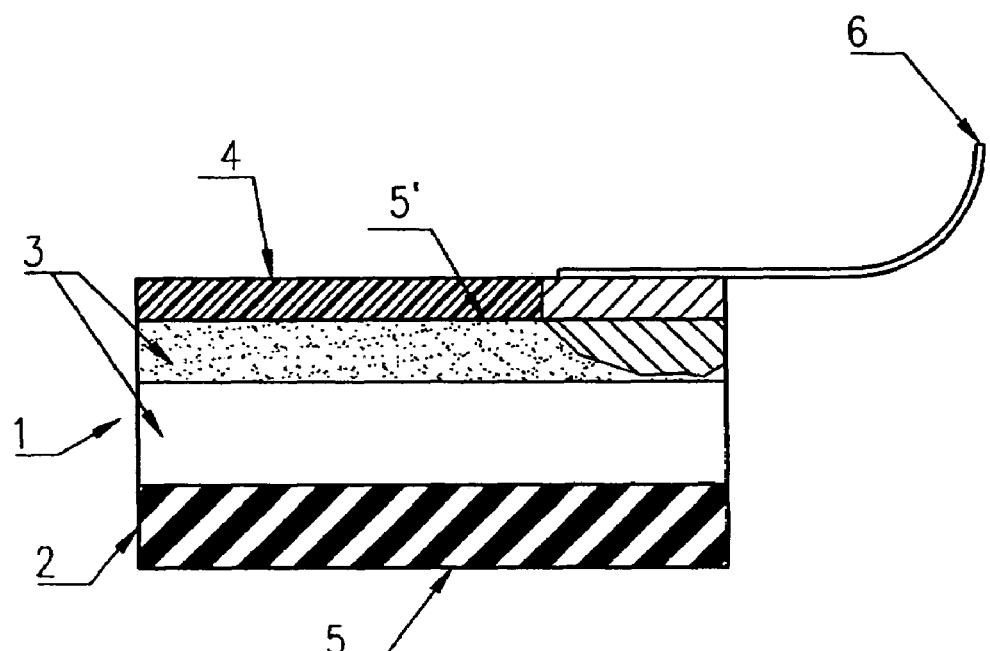
FIG. 4 shows an illustration of a comparable sealing strip associated with the prior art.

FIG. 4 illustrates a sealing strip 1 according to the prior art which is intended for use in automobiles and comprises a layered structure. The reference numeral 2 thus designates an outer layer consisting of rubber whose one side is covered with a layer 3 consisting of a cold-adhesive such as e.g. acrylic foam, wherein a cover sheet 4 covers the layer 3 towards the outside.

The cover sheet 4 is selected in a manner known per se either in terms of its material or as a result of its surface coating so as to be tailored to the adhesive system of the layer 3 such that this cover sheet is not permanently connected or adhered to the layer 3 and can be released therefrom at any time.

A sealing strip of this type which—as shown in the drawing—is rectangular in cross-section is provided in its initial state as continuous product in the form of a roll, wherein the cover sheet 4 prevents the individual windings of the roll from sticking together. Discrete longitudinal elements are then unwound from this roll and directed to a specific application which is characterized by virtue of the fact that the cover sheet 4 is first to be removed and that an adhesive connection is established between the layer 3 and a structural element of a vehicle. In the assembled state, the outer surface 5 of the layer 2 thus forms a visible surface or the part of the sealing strip 1 which when subjected to elastic compression is intended to lie in a sealing manner against an opposite-lying structural element of a vehicle. The reference numeral 5' thus designates the surface which is intended for adhesive purposes and is not exposed until just before the sealing strip is mounted.

In dependence upon the actual application, sealing strips 1 of this type are cut according to specific lengths, wherein one or several tear-off tabs 6 are provided along the sealing strip 1. These tear-off tabs can consist, for example, of polyethylene and must be adhered individually to the outer side of the cover sheet 4. The nature of this adhesion must be such that by taking hold of the tear-off tab 6 it is possible to pull off the cover sheet 4 so as to expose the layer 3 and these tear-off tabs generally extend in a planar manner such that they can be held comfortably by hand.

As already mentioned in the introduction, the material cost of these tear-off tabs on the one hand and the manner in which they are applied to the cover sheet by adhesion create a situation which should not be underestimated and which places a burden on the cost of producing a ready-to-use sealing strip.

The sealing strip 1' in accordance with the invention whose structure and handling are described in FIGS. 1 to 6 is proposed in order to eliminate these and other disadvantages. As far as its sequence of layers is concerned, this sealing strip has a similar structure to the sealing strip 1 as shown in FIG. 4, so that comparable functional elements of the two sealing strips 1, 1' are designated by the same reference numerals and to avoid repetition will not be described further.

In its initial state, the sealing strip 1' is provided in the same manner in a wound up form and—starting from this state—is unwound into discrete longitudinal elements, of which each is then provided in accordance with the invention with at least one tear-thread 7. The tear-thread 7 which consists, for example, of polyethylene extends through the substance of the cover sheet 4 and its two ends which protrude therefrom are provided with hooks, extensions or other preferably planar holding elements 8, 8' which in any event positively oppose any attempt to simply pull the tear-thread 7 out of the substance of the cover sheet. These holding elements 8, 8' are also of such a size and/or configuration as to allow the cover sheet 4 to be held manually and subsequently to be removed from the layer 3.

A stitching device 9 which is known per se and is equipped with a placing needle 10 is used for inserting the tear-thread 7.

Figure 1:
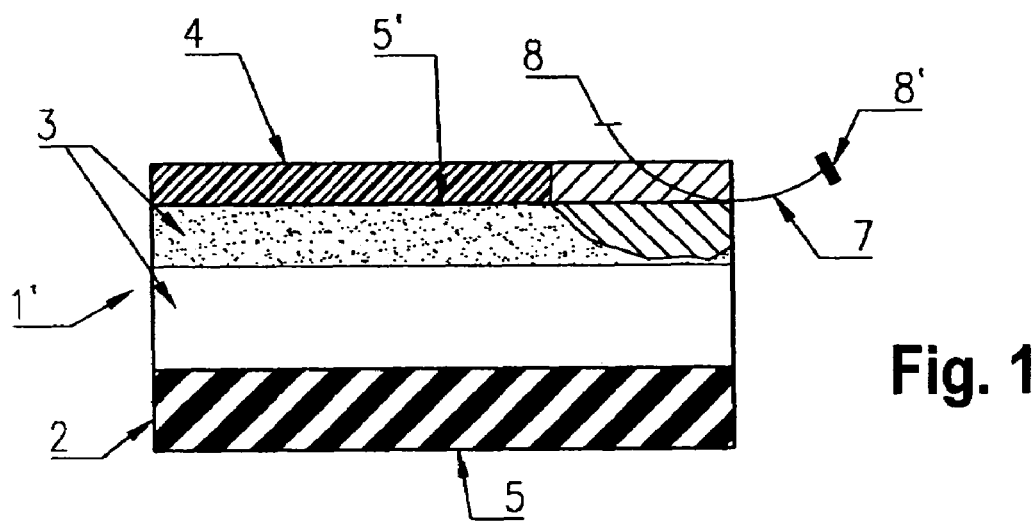
FIG. 1 shows a cross-sectional illustration of a sealing strip in accordance with the invention.
Figure 2:
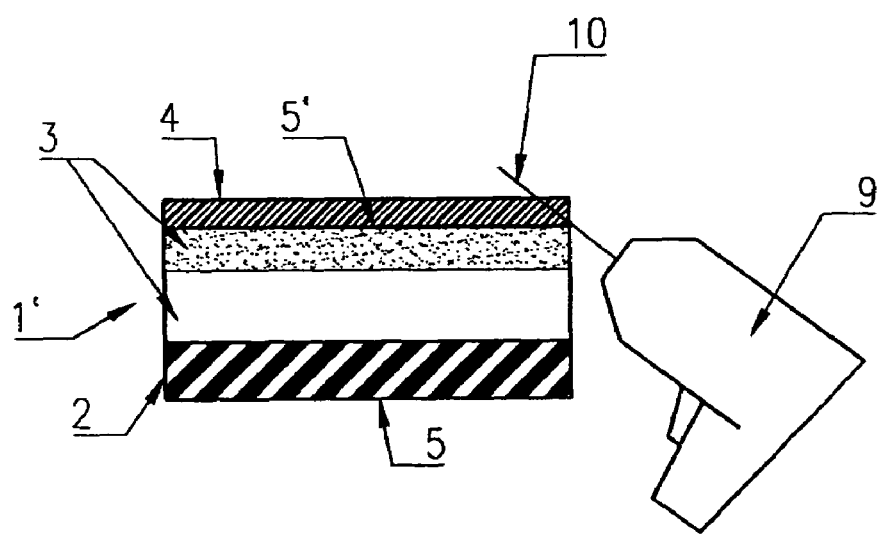
FIG. 2 shows a cross-sectional illustration similar to that of FIG. 1 prior to insertion of the tear-thread.
Figure 3:
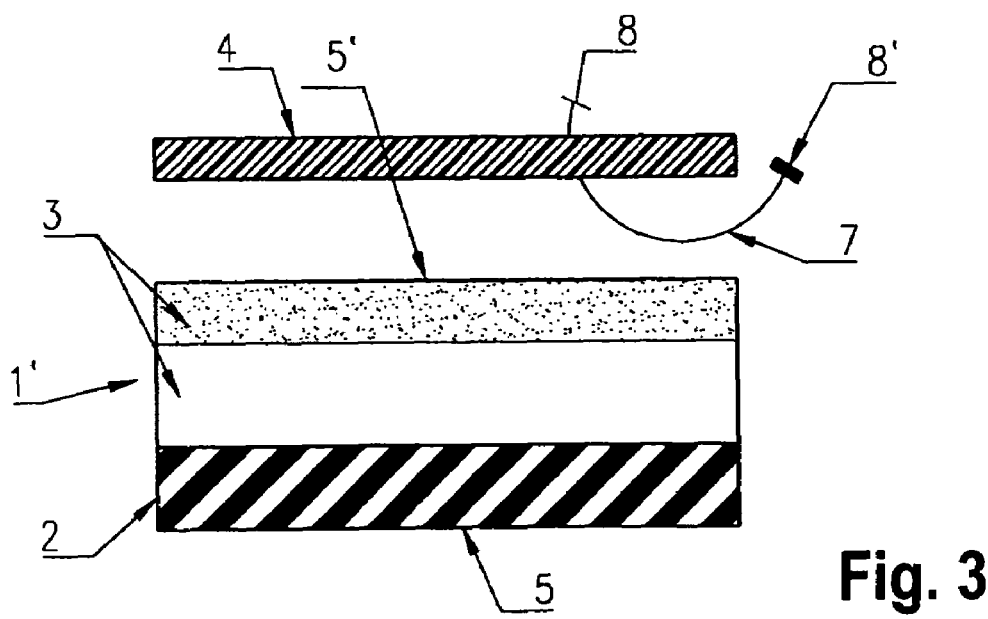
FIG. 3 shows an illustration in cross-section of the cover sheet of a sealing strip in accordance with the invention, said cover strip being removed using the tear-thread.

In order to insert the individual tear-threads 7, the placing needle 10—as shown schematically in FIG. 2—is pushed laterally through the substance of the tear-off tab 6, wherein by means of this needle a tear-thread 7 is then inserted as the placing needle 10 is withdrawn. After placement, the tear-thread 7 assumes a position illustrated schematically in FIG. 1, wherein at least one, preferably several mutually spaced apart tear-threads 7 can be placed along a pre-cut longitudinal element of the sealing strip 1'.

The way in which the sealing strip 1' in accordance with the invention is used in practical terms is similar to the way in which the sealing strip 1 shown in FIG. 4 is used. That is to say, by manually taking hold of one of the two holding elements 8, 8' of the tear-thread 7, the cover sheet 4 is removed from the layer 3, so that the layer is exposed and is thus provided for adhesion with an opposed surface of a motor vehicle structure.

In comparison with the prior art set forth in the introduction, the sealing strip 1' in accordance with the invention which is equipped with tear-threads 7 is characterized by the fact that it is extremely simple to produce, as it is possible to place the tear-threads 7 in a extremely short amount of time by shooting them in using a stitching device 9. In addition, the material outlay for providing tear-threads turns out to be significantly less in comparison with the known tear-off tabs.

In the case of the sealing strip 1' which is equipped in accordance with the invention with tear-threads 7, an element is provided which can be handled extremely reliably, is characterized by low production costs and can be used in a particularly advantageous manner in automobile construction.

However, the invention is not limited to automobile construction and can basically be used in any technical functions where gaps always have to be sealed.

Figure 5:
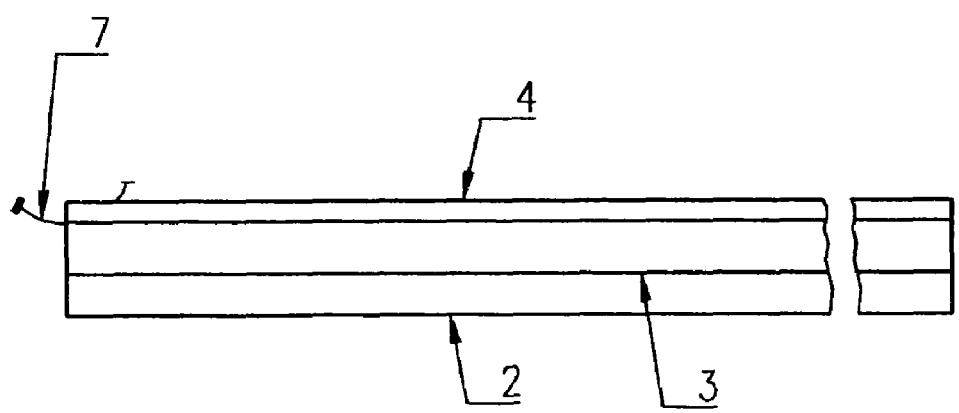
FIG. 5 shows an illustration of a linear structure of a sealing strip.
Figure 6:
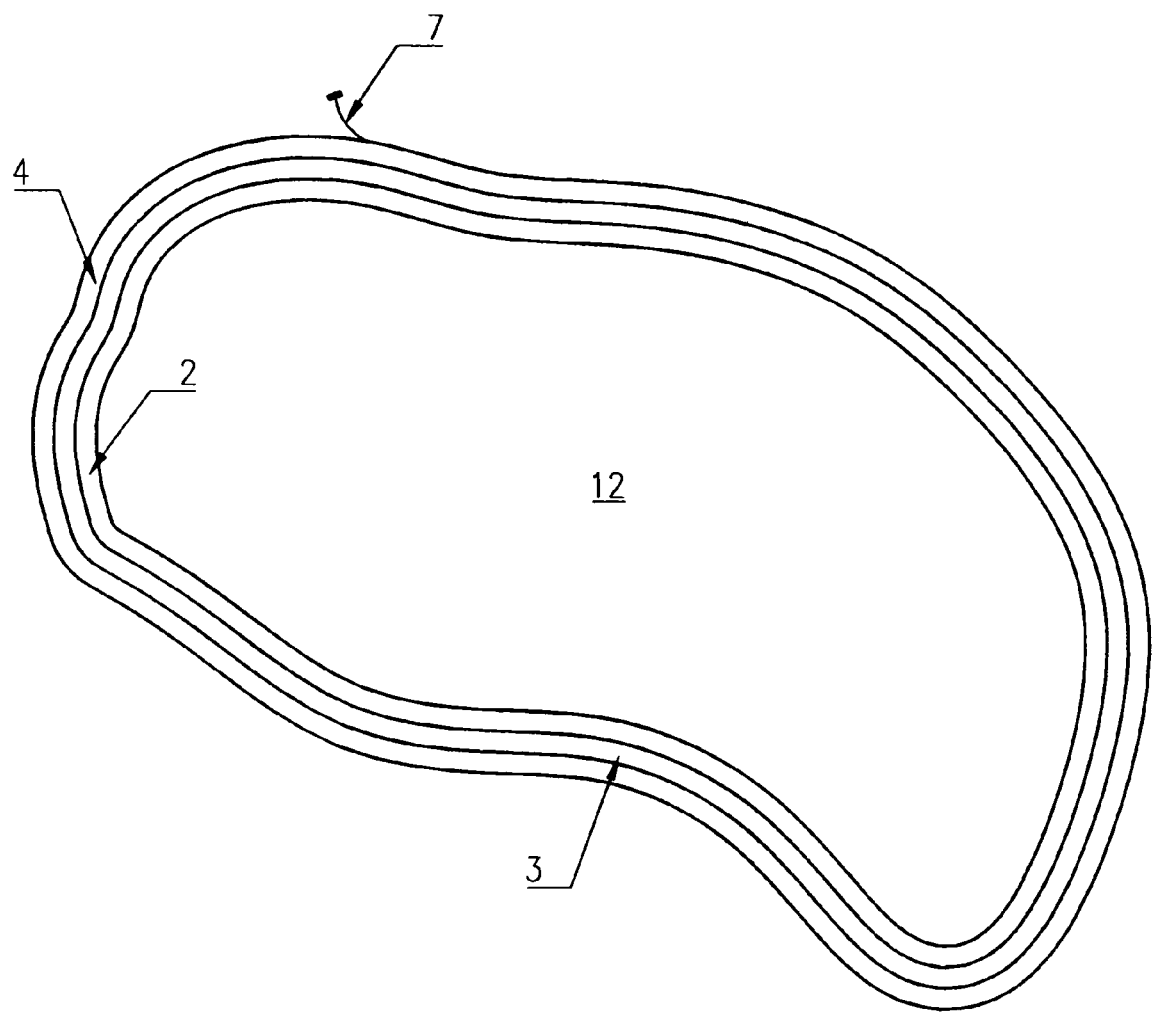
FIG. 6 shows an illustration of an annular structure of a sealing strip.

FIGS. 5 and 6 respectively illustrate linear and annular structures of sealing strips 11, 12 in accordance with the invention as well as how they can be provided for the user.

The invention claimed is:

1. A sealing strip for sealing a gap between two parts, said sealing strip comprising:
   a flexible layer having a first surface adhereable to one of said parts and a second surface sealingly engageable with the other of said parts;
   an adhesive layer positioned on said first surface and adapted to adhere said first surface to said one part;

a cover sheet positioned over said adhesive layer and releasably attached thereto; and a tear thread extending through the thickness of said cover sheet, one end of said tear thread protruding from one side of said cover sheet, an opposite end of said tear thread being positioned on an opposite side of said cover sheet, a planar anchoring element being attached to one of said ends of said tear thread and connecting said tear thread to said cover sheet for removing said cover sheet from said adhesive layer in one piece.

2. A sealing strip according to claim 1, wherein said anchoring element extends substantially perpendicularly to said tear thread.

3. A sealing strip according to claim 1, wherein said tear thread comprises a synthetic material.

4. A sealing strip according to claim 1, wherein said flexible layer comprises an elastomer and said adhesive layer comprises acrylic foam.

5. A sealing strip according to claim 1, wherein said flexible layer has a linear shape.

6. A sealing strip according to claim 1, wherein said flexible layer has the shape of a closed curve.

7. A sealing strip according to claim 2, wherein said tear thread comprises a synthetic material.

8. A sealing strip according to claim 2, wherein said flexible layer comprises an elastomer and said adhesive layer comprises acrylic foam.

9. A sealing strip according to claim 3, wherein said flexible layer comprises an elastomer and said adhesive layer comprises acrylic foam.

10. A sealing strip according to claim 7, wherein said flexible layer comprises an elastomer and said adhesive layer comprises acrylic foam.

11. A sealing strip according to claim 2, wherein said flexible layer has a linear shape.

12. A sealing strip according to claim 3, wherein said flexible layer has a linear shape.

13. A sealing strip according to claim 4, wherein said flexible layer has a linear shape.

14. A sealing strip according to claim 7, wherein said flexible layer has a linear shape.

15. A sealing strip according to claim 8, wherein said flexible layer has a linear shape.

16. A sealing strip according to claim 10, wherein said flexible layer has a linear shape.

17. A sealing strip according to claim 2, wherein said flexible layer has the shape of a closed curve.

18. A sealing strip according to claim 3, wherein said flexible layer has the shape of a closed curve.

19. A sealing strip according to claim 4, wherein said flexible layer has the shape of a closed curve.

20. A sealing strip according to claim 7, wherein said flexible layer has the shape of a closed curve.

21. A sealing strip according to claim 8, wherein said flexible layer has the shape of a closed curve.

22. A sealing strip according to claim 10, wherein said flexible layer has the shape of a closed curve.

* * * * *